US 6,663,157 B1

(12) United States Patent
Hofmann et al.

(10) Patent No.: US 6,663,157 B1
(45) Date of Patent: Dec. 16, 2003

(54) REMOVABLE MOTOR VEHICLE SEAT

(75) Inventors: Jochen Hofmann, Küps (DE); Gregor Kroener, Gundelsheim (DE); Karl-Heinz Fritz, Dettenhausen (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/701,640

(22) PCT Filed: May 18, 1999

(86) PCT No.: PCT/DE99/01525
§ 371 (c)(1),
(2), (4) Date: Nov. 29, 2000

(87) PCT Pub. No.: WO99/62736
PCT Pub. Date: Dec. 9, 1999

(30) Foreign Application Priority Data

May 29, 1998 (DE) .......................................... 198 25 439

(51) Int. Cl.$^7$ .............................................. B60N 2/005
(52) U.S. Cl. ................................ 296/65.03; 248/503.1; 297/331
(58) Field of Search ........................ 296/65.01, 65.03; 248/503.1; 297/331, 335, 336

(56) References Cited

U.S. PATENT DOCUMENTS 6,250,703 B1 * 6/2001 Cisler et al. ............. 296/65.03
6,257,641 B1 * 7/2001 Fritz et al. ................ 296/65.03
6,279,981 B1 * 8/2001 Mesnage .................. 296/65.03
6,343,939 B1 * 2/2002 Inoue ....................... 439/34 X
6,431,631 B1 * 8/2002 Hofmann et al. ........ 296/65.03

FOREIGN PATENT DOCUMENTS

| DE | 29 05 235 | 8/1980 |
| DE | 44 04 935 | 8/1995 |
| EP | 0 558 408 | 9/1993 |
| FR | 2 769 269 | 4/1999 |

* cited by examiner

Primary Examiner—Dennis H. Pedder
(74) Attorney, Agent, or Firm—Christie, Parker & Hale, LLP

(57) ABSTRACT

A removable motor vehicle seat includes a locking mechanism, an operating element for triggering the locking mechanism and at least one electric and/or pneumatic interface which has a detachable connector element. A contact mechanism is provided for connecting and/or disconnecting the connector element which is forcibly coupled to the locking mechanism so that removal or installation of the vehicle seat takes place in at least two chronologically successive phases wherein in one phase exclusively a connection/disconnection of the connector element takes place and in the other phase exclusively a locking/unlocking of the vehicle seat takes place. The removable vehicle seat ensures an automatic functionally reliable connection and disconnection of the electric and/or pneumatic components of a vehicle seat during the installation and dismantling of the seat.

21 Claims, 15 Drawing Sheets

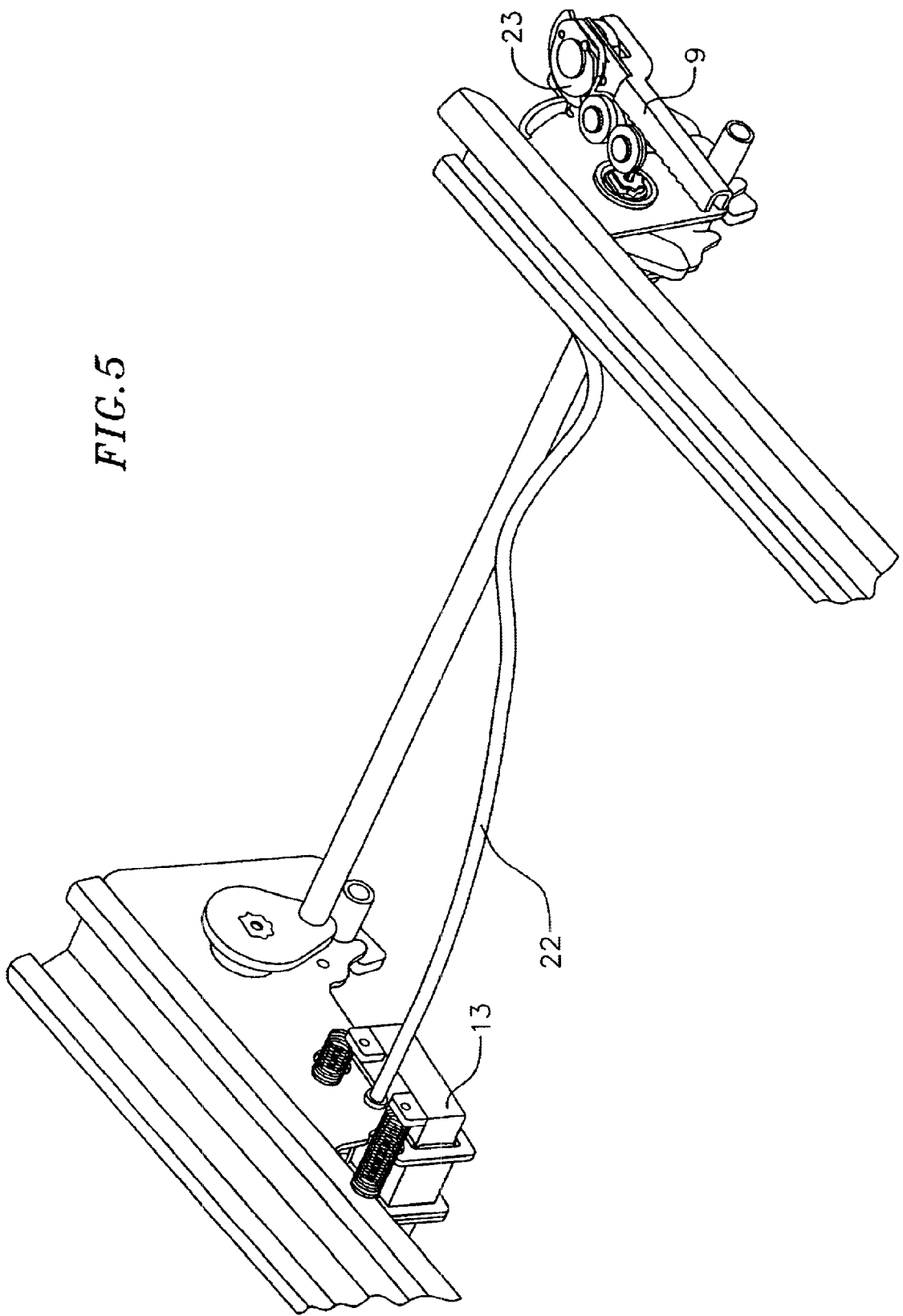

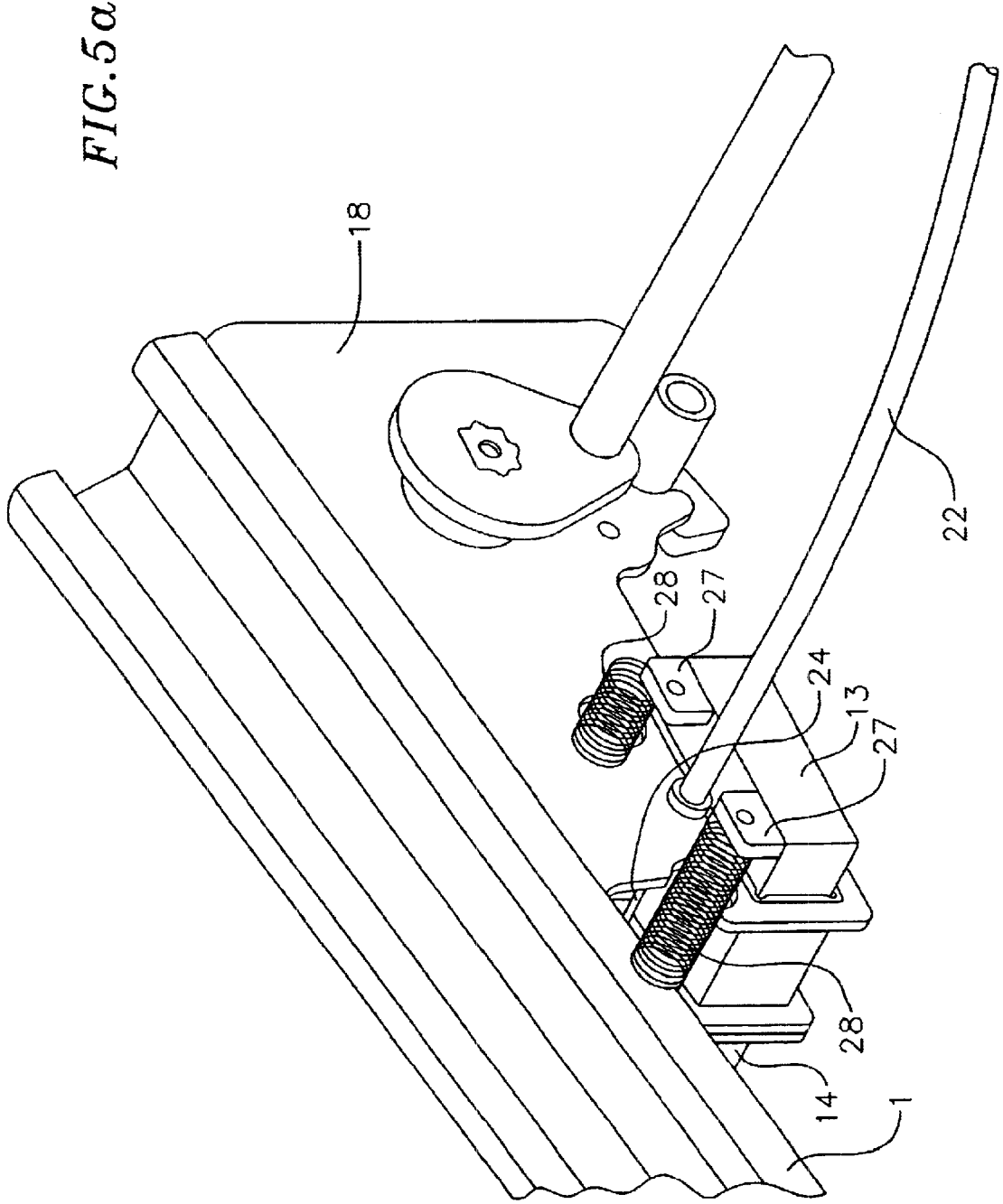

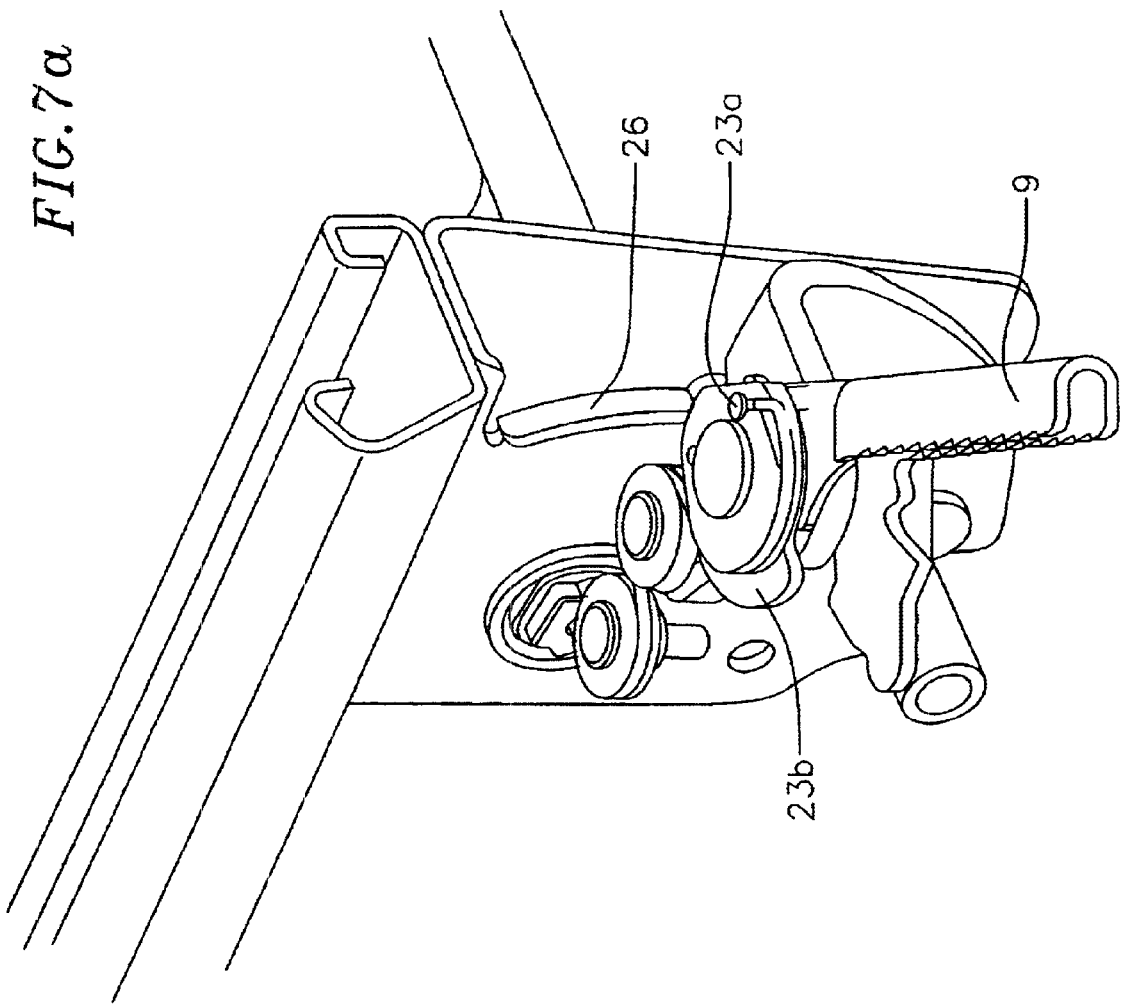

REMOVABLE MOTOR VEHICLE SEAT

CROSS REFERENCE TO RELATED APPLICATIONS

This application claims priority of International Application No. PCT/DE99/01525, dated May 18, 1999, which in turn claims priority of German application No. 198 25 439.3, filed May 29, 1998.

FIELD OF THE INVENTION

The invention relates to a removable motor vehicle seat, and more particularly, to a removable motor vehicle seat having a locking mechanism for locking and/or unlocking the vehicle seat to the vehicle floor.

BACKGROUND

Vehicle seats which can be easily removed by the user are becoming increasingly preferred and are known per se. The DE 44 04 935 A1 describes just such a device for connecting a vehicle seat to the bearing elements on the vehicle floor. A locking device thereby displaces the vehicle seat during unlocking into a removal position whilst during installation of the seat the locking device is first transferred into a release position and then into a locking position. A simple fitting or dismantling is readily possible through suitable locking and unlocking devices and bearing elements.

Within the scope of improving comfort and safety electrically or pneumatically operated components are integrated to an increasing extent into the vehicle seat. Examples of this are the electric seat adjustment, seat heating, seat occupancy detection, speakers in the head rests or airbags installed in the back rest.

In order to remove a vehicle seat equipped with such components first the electric or pneumatic connecting elements have to be separated in order not to damage the leads. This is tiresome since several separate hand actions are necessary. Furthermore a functionally reliable contacting is not guaranteed since after inserting a seat connecting the contacts of the plug can be overlooked.

From EP A 0 558 408 a vehicle seat of the generic type is known which has an electrically operable locking mechanism with a connector element which is secured in a connector socket on the vehicle floor through a contact mechanism. A functionally reliable connection is not ensured for electric or pneumatic components of the seat.

SUMMARY OF THE INVENTION

The object of the present invention is therefore to provide a removable vehicle seat which with a simple construction ensures a functionally reliable connection or disconnection of the electric and/or pneumatic components of the motor vehicle seat during installation or dismantling. In particular, it is desired that the connection of the connector elements take place automatically and without any faulty handling by the user as the seat is fitted or dismantled.

By providing a contact mechanism for connecting or disconnecting a connector element and automatically coupling the contact mechanism to a locking mechanism so that removal or insertion of a vehicle seat takes place in at least two chronologically successive phases, it is possible to achieve a functionally reliable connecting or disconnecting of electrical or pneumatic components. The user does not have to worry about making the connection since this is done automatically without any danger of faulty handling.

The fact that removal or installation of the vehicle seat takes place in at least two chronologically successive phases, in which in one phase the connector element is exclusively connected or disconnected, and in the other phase the motor vehicle seat is exclusively locked or unlocked, ensures that the electric or pneumatic connections between the vehicle seat and another vehicle component do not become damaged as the seat is removed or installed. Before unlocking and removing the seat, the connector element through which the seat and other vehicle components are connected electrically and/or pneumatically is first automatically disconnected. In reverse, when installing the seat, a connection can only be made after the seat has become securely locked.

The installation and/or dismantling of a seat is thereby carried out in a simple manner since only the operating element has to be swivelled or moved so that the seat is ready for dismantling. In addition the solution according to the invention reduces the costs of the production and repairs of motor vehicles since the assembly is simplified, the assembly time is shortened, and the functionally reliable handling minimises any costs incurred through damage to incorrectly positioned connector elements.

In a preferred embodiment of the invention, the at least two chronologically successive phases of the removal or installation of the vehicle seat are controlled and triggered through corresponding operating phases of the operating element. Only one operating element has to be handled for dismantling or installing the seat. The at least two chronologically successive phases are preferably triggered by an at least two-phase swivel movement of the operating element, either about the same swivel axis or about different swivel axes, alternatively through one swivel movement and one linear movement, alternatively through two linear movements of the operating element. Through the swivel and/or linear movements of the operating element, swivel and/or linear movements in the contact mechanism are triggered which lead to a connection/disconnection or locking/unlocking.

In a further development of the invention four chronologically successive phases are run through overall during the removal of the vehicle seat, namely a) in the first phase an existing contact play of the connector element in the interface is passed through;

b) in the second phase the connector element is disconnected c) in the third phase a safety clearance of the unlocking action is passed through and d) in the fourth phase the vehicle seat is unlocked from the vehicle floor.

In a preferred advantageous embodiment of the invention the locking mechanism has on each seat rail at least one locking part which can be brought into engagement with an associated fixing part on the vehicle floor. At least two locking parts of the two seat rails are thereby connected together through a coupling element so that only one operating element is required to lock all the locking positions. The contact mechanism has means for attaching or releasing the connector element at the interface. The locking parts and the means for inserting or releasing the connector element are both coupled to the operating element for triggering the relevant functions, with blocking means being provided so that, depending on the movement phase of the operating element, only a locking/unlocking or a connection/disconnection action can take place.

In a further development of this embodiment the coupling element is capable of moving both in rotation and also in translation and is fixedly connected through a follower to the connector element whereby in a first movement phase of the operating element the coupling element is moved in translation and through a follower a disconnection/connection of the connector element takes place, and in a second movement phase of the operating element the coupling element is turned and the locking parts are thereby swivelled and the seat unlocked or locked. In this embodiment, when interacting with the operating element the coupling element engenders both the disconnection and unlocking.

The coupling element is preferably designed as a rod linkage since in this way both torque and shear forces can be reliably and easily transferred.

In order to ensure that, depending on the movement phase of the operating element solely a locking/unlocking or connection/disconnection takes place, in a preferred variation during the disconnection phase a rotation of the coupling element and thus an unlocking of the seat is prevented through a fixed blocking element against which the follower is supported until the disconnection is completed. By way of example, a fixing bolt which is already provided on the vehicle floor can be used as the blocking element.

As an alternative or an addition, during a locking/unlocking or connection/disconnection action, each other process is blocked in that the degree of freedom of movement of the operating element associated with each other phase is blocked through blocking elements, such as projections etc, mounted in the region of the operating element.

In a preferred embodiment of the invention spring means are provided in active connection between the operating element and the connector element to produce a pretensioning force on the connector element so that it connects in the interface. The connector element is thus always held in the contact position. This, on the one hand, prevents vibrations loosening the contact connection and on the other ensures a secure connection as the seat is installed.

In an advantageous development of the invention, the active connection between the operating element and connector element is simply produced through a draw means, such as for example, a draw cable or chain, connected to the operating element. As a variation, a rod linkage is provided to transfer the forces.

In a further development of the invention the operating lever is guided in a slide guide so that the operation of the operating lever in the first movement phase from a certain point no longer leads to further disconnection of the connector element, but only to a displacement of the operating lever in the slide guide. The remaining swivel movement of the operating element then serves to initiate the unlocking of the seat on the vehicle floor. During assembly of the seat, once the seat is locked the operating lever is drawn back by the tensile force of the spring means in the slide guide, which is accompanied by the connection of the connector element.

In a further preferred variation of the invention, an active connection between the operating element and connector element takes place not through the coupling element which couples the locking parts of the seat rails, but directly through a Bowden cable which is connected to the operating element. This saves space for the linear movement of the coupling element and avoids expensive bearing systems for the linear movement. The cable of the Bowden cable unit is thereby preferably suspended directly from the connector element. The end of the Bowden cable on the connector element side is supported on the seat rail or on another part fixed on the seat. A pretensioning force is preferably created by a compression spring which is supported on a collar at the end of the Bowden cable and on the connector element and endeavours to press the connector element into the associated socket.

BRIEF DESCRIPTION OF THE DRAWINGS

These and other features and advantages of the present invention will be better understood by reference to the following detailed description when considered in conjunction with the accompanying drawings wherein:

FIG. 5 is a partial perspective view of a pair of lower seat rails having a second embodiment of a locking and contact mechanism according to the invention;

FIG. 5a is an enlarged perspective view of the connector element area of FIG. 5;

FIGS. 7, 7a and 7b are enlarged perspective views corresponding to FIGS. 6–6b of the operating element of the embodiment of FIG. 5.

DETAILED DESCRIPTION

Figure 1:
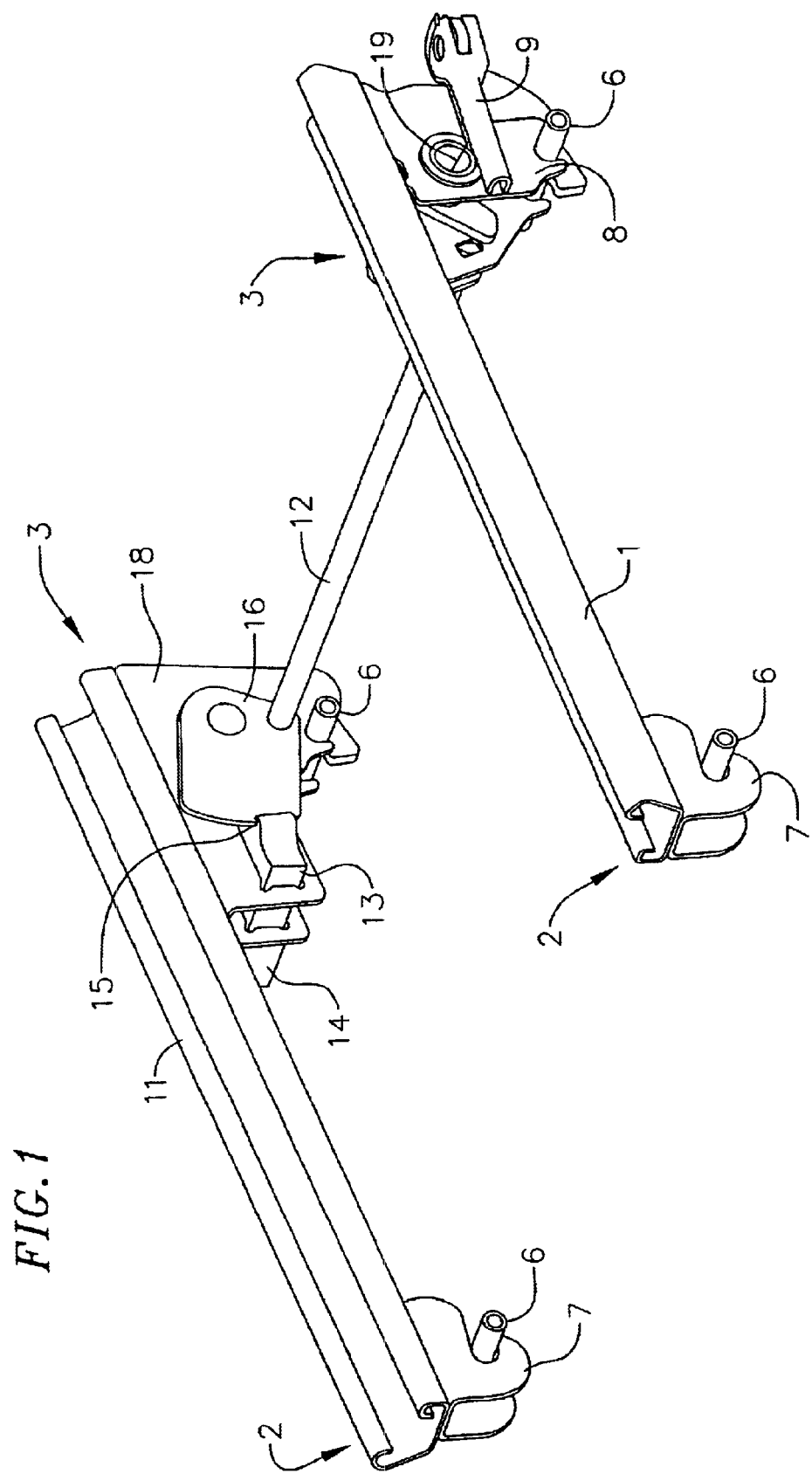
FIG. 1 is a perspective view of a pair of lower seat rails with a first embodiment of a locking and contact mechanism according to the invention.
Figure 2:
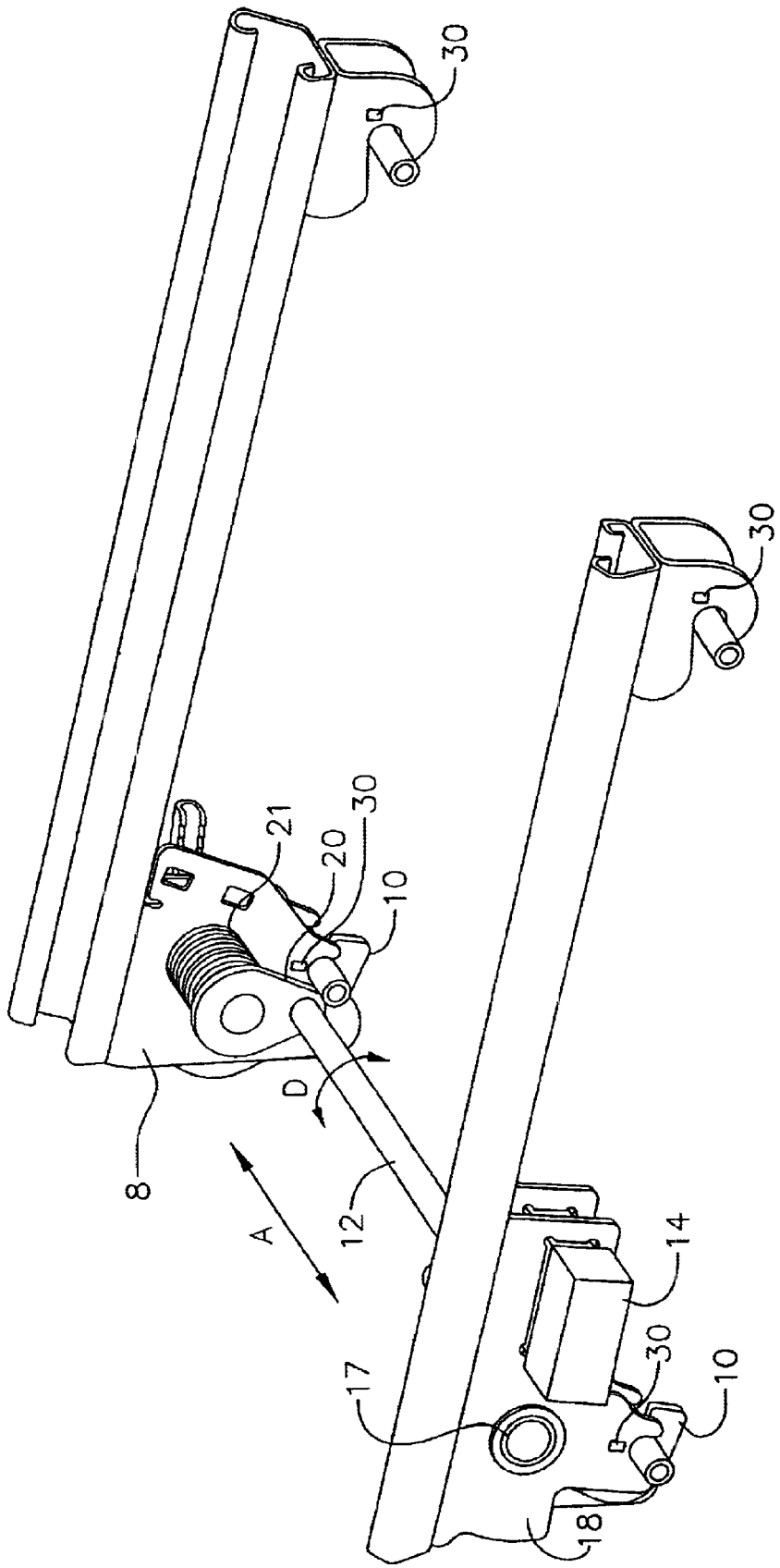
FIG. 2 is another perspective view of the locking and contact mechanism of FIG. 1.

FIGS. 1 and 2 show from different perspectives, two lower seat rails 1 and 11 of a vehicle seat (not shown in further detail) with front and rear fixing areas 2 and 3 for connecting the lower rails or the seat base to the vehicle floor (not shown). The fixing areas 2, 3 have bearing elements which consist of retaining parts 6 formed as bolts and anchored in the floor panel. Mounted on the lower seat rails 1 and 11, in the first fixing area 2, are connecting elements 7 of hooked shape, suspended in the retaining parts 6 and thus restricting the mobility of the lower seat rails 1 and 11 by causing a partial fixing.

In the second fixing area 3 the lower rails 1 and 11 are supported on the retaining parts 6 by connecting elements 8 and 18. The connecting element 8 has a recess which is shaped so that the vehicle seat or the lower seat rails 1 and 11 occupy the proposed end position during installation even when not positioned quite exactly. With reference also to FIG. 2, attached to the first seat rail 1 is an operating element 9 through which a locking part 10 can be forcibly swivelled about the retaining part 6 for the purpose of locking. Attached to the second lower seat rail 11 is (FIG. 1) a corresponding locking part 10 which is in active connection with the operating element 9 through a rod linkage 12 so that the locking action takes place on each side. The locking parts 10 are fixedly connected to the rod linkage 12, for example, through welding. In the illustrated locking position the lower seat rails 1 and 11 are fixedly connected to the vehicle floor.

Referring now back to FIG. 1, on the seat rail 11 opposite the operating element 9 a recess is provided in the connecting element 18, and a connector element 13 is mounted releasable in the recess. Supply and control leads of electric, electronic and/or pneumatic devices of the vehicle seat are detachably connected to the seat through the connector element 13. A socket 14 for the connector element is mounted fixed on the bodywork and forms the counter member for the connector element 13. Fixing the socket 14 is independent of the structural features inside the vehicle and can be undertaken both on the central tunnel and on the door sill. In alternatives embodiment it is also possible to attach the socket on the vehicle floor.

The connector element 13 is finished to incorporate a groove-like guide 15 into which engages a disc 16 which is rigidly connected to the rod linkage 12 and which is mounted for rotary movement and longitudinal displacement in the connecting element 18. From FIG. 2 it can be seen that the rotary axis of the disc is mounted in a socket bush 17 and enables both movement of the rod linkage 12 in the direction of the double arrow A, across the extension direction of the seat rails 1 and 11, and also rotation in the direction of arrow D.

In accordance with FIG. 1, the transverse movement is achieved by swivelling the operating element 9 on which a cable 19 is fitted which is fixed on a disc 20 (FIG. 2) which is mounted for rotation and longitudinal displacement on the connecting element 8. By swivelling the operating element 9 the disc 20 is drawn in the direction of the connecting element 8. Since a rigid connection exists between the discs 16 and 20 through the rod linkage 12, the connector element 13 which is forcibly connected to the disc 16 through the guide 15 is likewise moved in the direction of the connecting element 8 and is separated from the connector element socket 14 which is locally fixed. The length of the displacement path thereby depends on the distance which has to be covered to separate the connector element 13 and socket 14.

Figure 3:
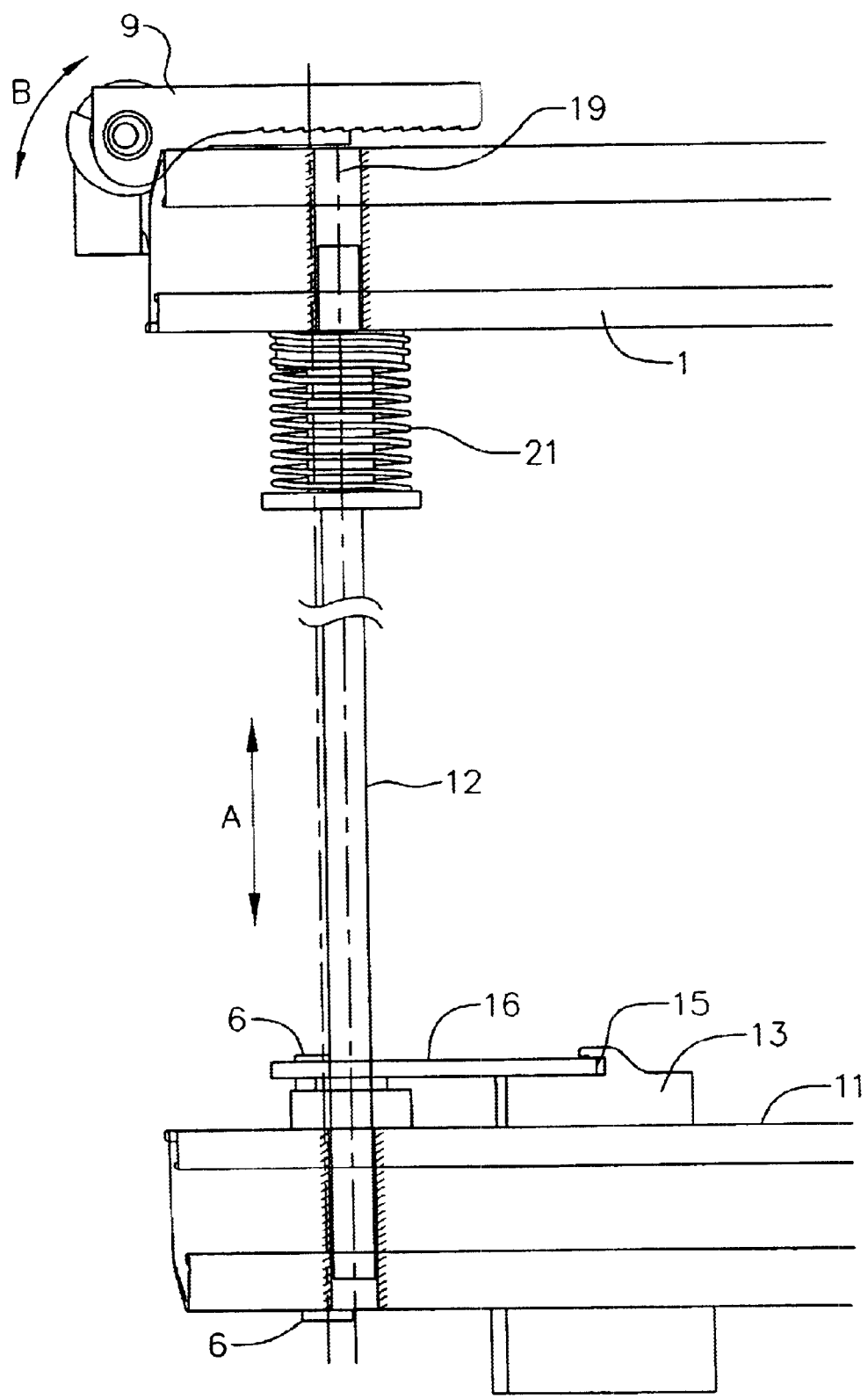
FIG. 3 is a top plan view of the pair of lower seat rails of FIG. 1.

FIG. 3 shows a partial sectional plan view of the arrangement of FIG. 1. Between the connecting element 8 and the disc 20 (FIG. 2) is a spiral spring 21 which presses the rod linkage 12 in the locking position in the direction of the connector element 13 so that a secure connection is ensured and the connector element 13 and socket 14 (FIG. 2) cannot become accidentally separated from each other.

After the operating element 9 is swivelled the contact connection is completely separated and the operating element 9 is located in a position which allows an easy swivel movement about an axis through the bearing positions of the rod linkage 12. To unlock the vehicle seat, a rotary movement is executed about the rotary axis of the rod linkage, and the locking parts 10 (FIG. 2) are swivelled backwards about the axis. To prevent unlocking whilst the contact connection exists, the disc 16 in the locking position adjoins the retaining part 6. Only after the rod linkage 12 has been displaced and the contact connection completely released can the disc 16 swivel past the retaining part 6. The locking parts 10 are thereby moved into an unlocking position and the vehicle seat can be removed.

Installing the vehicle seat can only take place in the reversed sequence, thus, first the connecting elements 8 and 18 are fitted onto the retaining elements 6, then the locking parts 10 are swivelled and finally a connection is made between the connector element 13 and socket 14. Inserting the connecting elements 8 and 18 when a connector element 13 is located in the connecting position is prevented by the disc 16 which would previously collide with the retaining part 6. Furthermore the connector elements can only be connected when the seat is locked so that on the one hand, the contact connection cannot become damaged and on the other, a displacement can only take place when the seat is firmly anchored. In this way an automatic mechanical coupling takes place between the unlocking/locking process and the disconnection/connection process. In addition, an interrogation means 30 can be used which during installation monitors the proper engagement of the seat at all locking points.

Figure 4A:
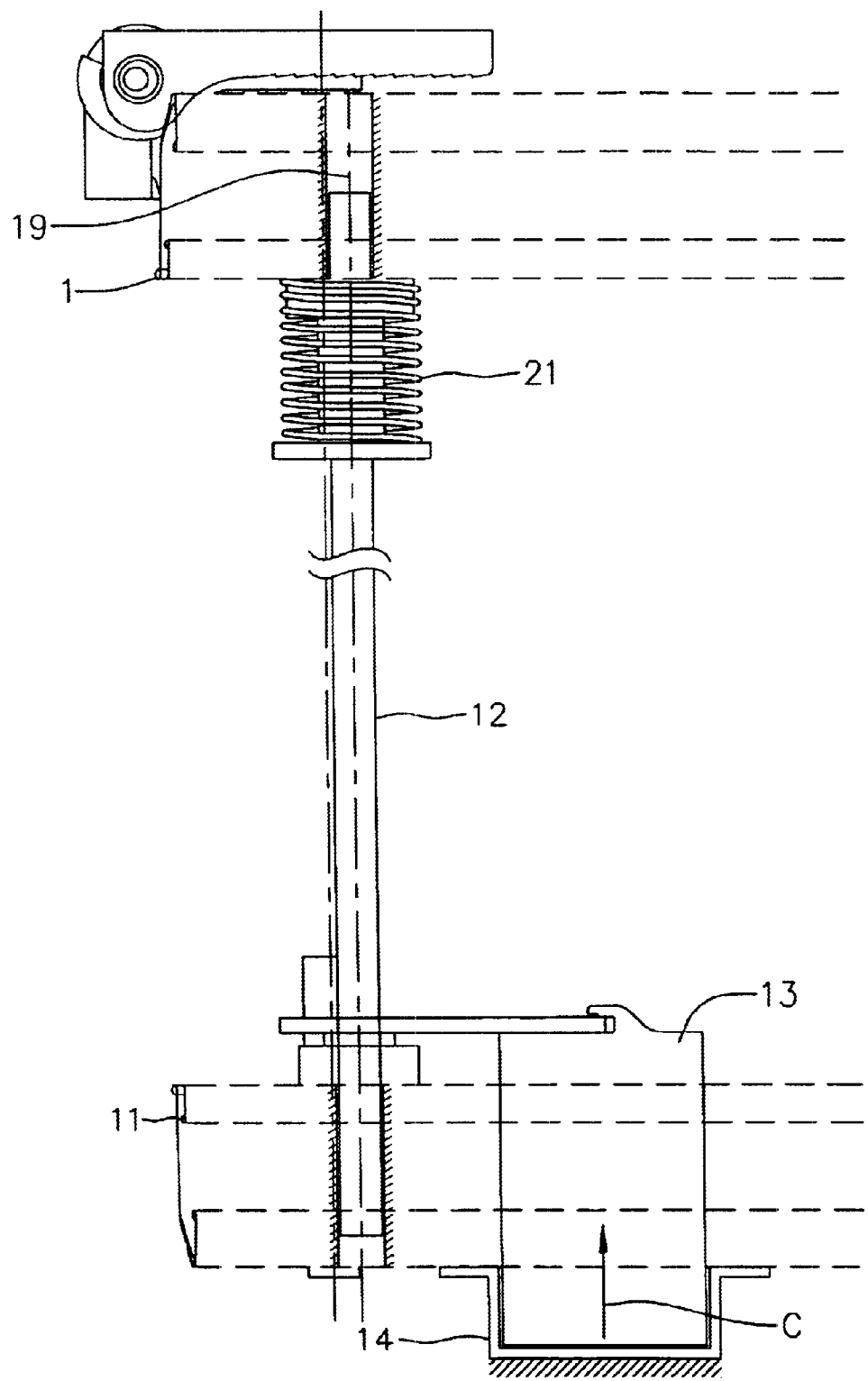
FIGS. 4a, 4b and 4c are sectional views describing an unlocking process of the locking and contact mechanism of FIG. 1.
Figure 4B:
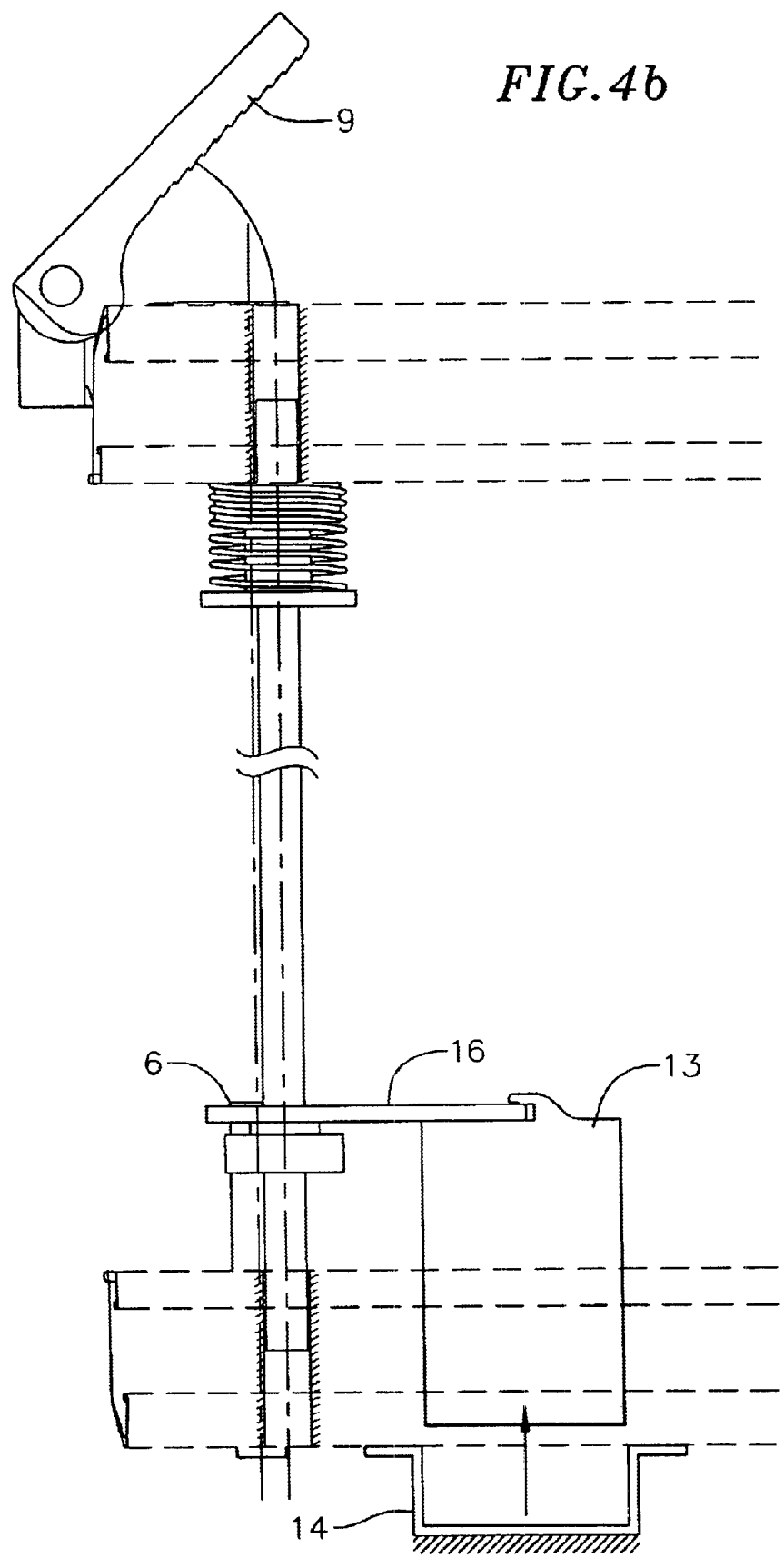
Figure 4C:
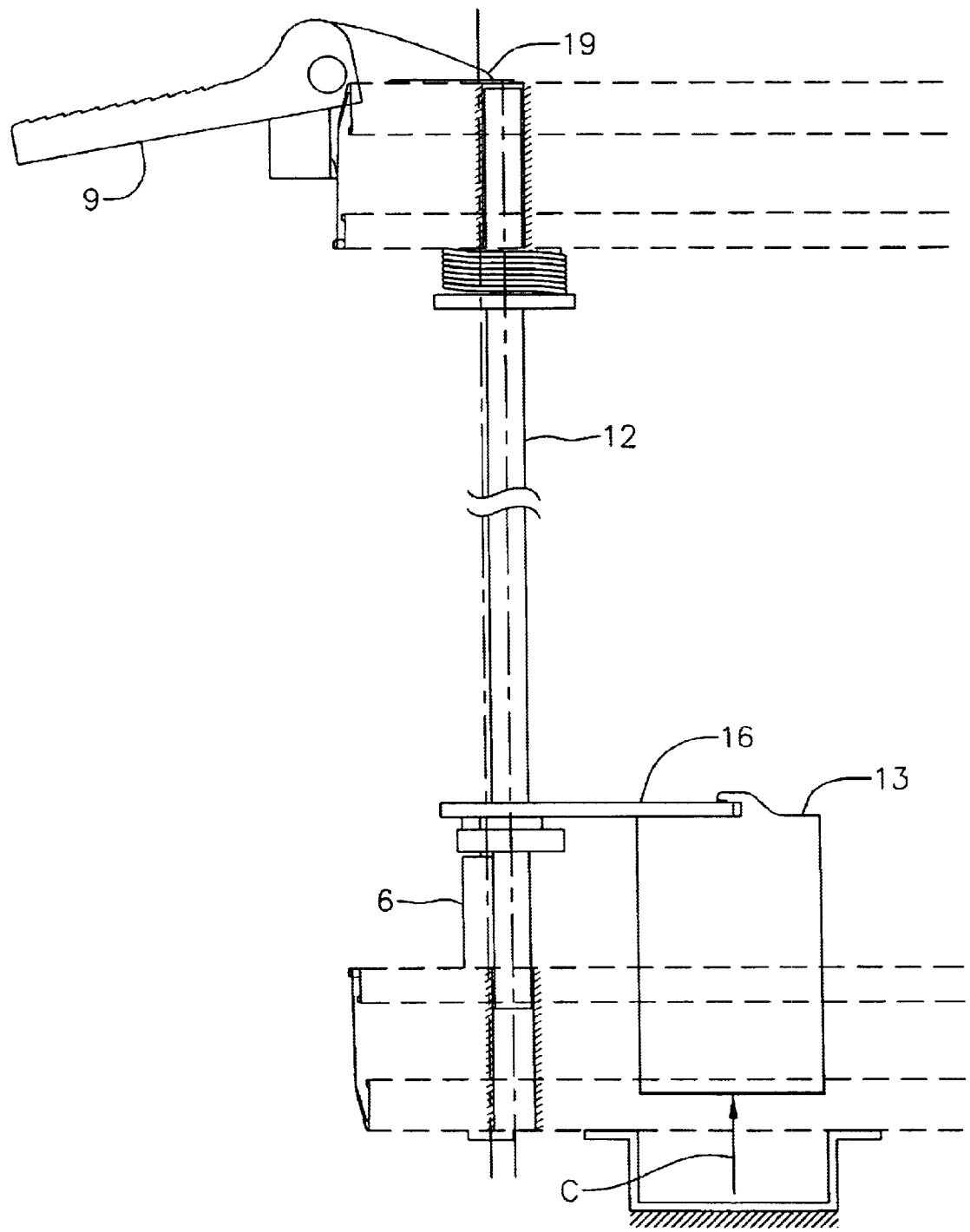

FIGS. 4a to 4c show the different phases of a disconnection process. In FIG. 4a the connector element 13 is located completely in the socket 14 and is loaded through the rod linkage 12 and the disc 16 with a spring force which acts against the opening direction, shown by the arrow C, and is produced through the spiral spring 21. The rod linkage 12 is connected through the draw cable 19 to the operating element 9. The rod linkage 12 is mounted rotatable and displaceable in the lower seat rails 1.

In FIG. 4b the operating element 9 is swivelled and the displacement of the cable fixing point is transferred through the cable 19 to the rod linkage 12. Through the disc 16 and the guide 15 the movement is passed on to the connector element 13, which is drawn out from the socket 14. In this "transitional phase" in which the connector element 13 has just been drawn out from the socket 14, the disc 16 during an attempted rotary movement strikes against the retaining part 6 and thus blocks the unlocking process.

Only when a further movement takes place in the direction of arrow C and the connector element 13 has reached a disconnection position with additional security, such as shown in FIG. 4c, can the disc 16 be moved past the retaining part through swivel movement of the operating element 9 about the rotary axis of the rod linkage 12. Through the rotation, the locking parts 10 (not shown) are swivelled, the lock is released and the seat can be removed. The second swivel movement of the operating element 9 for unlocking thereby takes place in a plane which lies substantially perpendicular to the plane in which the operating element was swivelled for disconnection. Through the perpendicular planes of movement it is ensured that the two movement phases of the operating element 9 take place strictly in succession.

Advantageously, the operating element 9 is located in a dead center position after disconnection and unlocking so that as a result of the spring force no automatic return swivel action can take place. This is achieved, for example, through a movable cable socket whereby in the unlocking position the cable end is guided between the rotary axis of the operating element 9 and the seat rail 1,11.

FIG. 5 shows an alternative embodiment of the invention in which the active connection is produced between the operating element 9 and the connector element 13 through a Bowden cable 22. A cable runs in a known way in the Bowden cable 22, and is suspended from the connector element 13 through a nipple at the end of the cable on the connector element side. As can be seen in particular from the detailed view of FIG. 5a, tensile springs 28 supported on the seat rail 1 and/or connecting element 18 and connected to the connector element 13 through fixing points 27 produce a pretensioning force which endeavours to force the connector element 13 into the associated socket 14.

The cable 24 which runs in the Bowden cable 22 is thereby suspended from the connector element 13 in the front area thereof (not shown). The end of the Bowden cable is supported on the connecting element 18 or alternatively on a different part fixed on the seat. During disconnection the tensile springs 28 are tensioned.

Figure 5B:
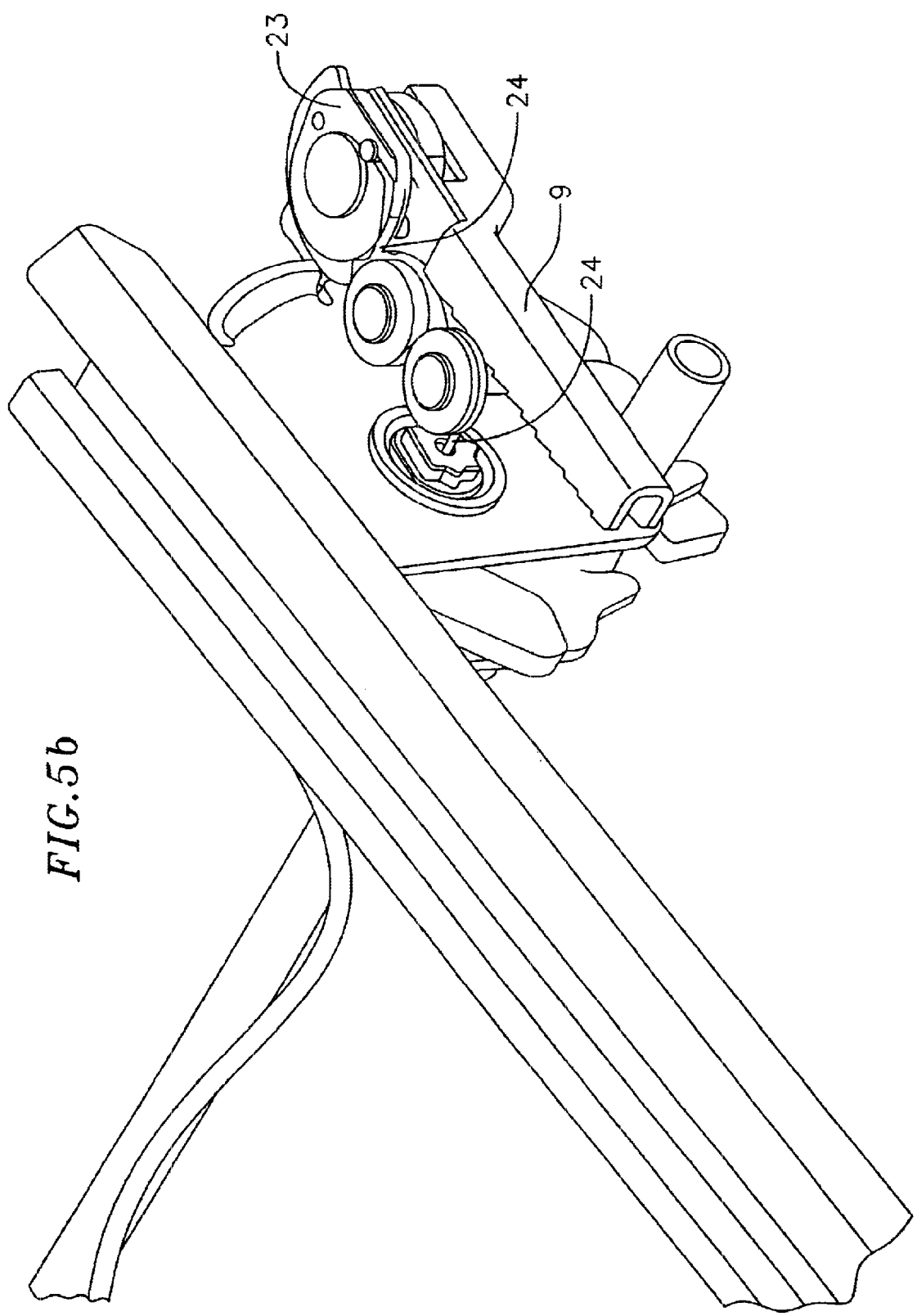
FIG. 5b is an enlarged perspective view of the operating element of FIG. 5.

According to FIG. 5b, the other end of the cable 24 of the Bowden cable 22 is suspended from a cable roller 23 which is mounted on the operating element 9. The arrangement of the operating element 9, the cable roller 23, and the associated components is shown in plan view in FIGS. 6 to 6b, and three-dimensionally in FIGS. 7 to 7b, with the same movement phases being shown in each of the relevant figures. It is already pointed out here that the attachment of the cable on the operating element 9 described in these figures can also be used in the embodiment of the invention described with respect to FIGS. 4 to 4c.

According to FIGS. 6–6b and 7–7b, the cable 24 of the Bowden cable 22 is suspended from a nipple chamber 23a of the cable roller 23. The cable 24 is thereby guided over two fixed guide pulleys 25a, 25b in order to provide a high translation ratio. The cable roller 23 has a protruding nose 23b which can be seen particularly clearly in FIG. 7.

Figure 6:
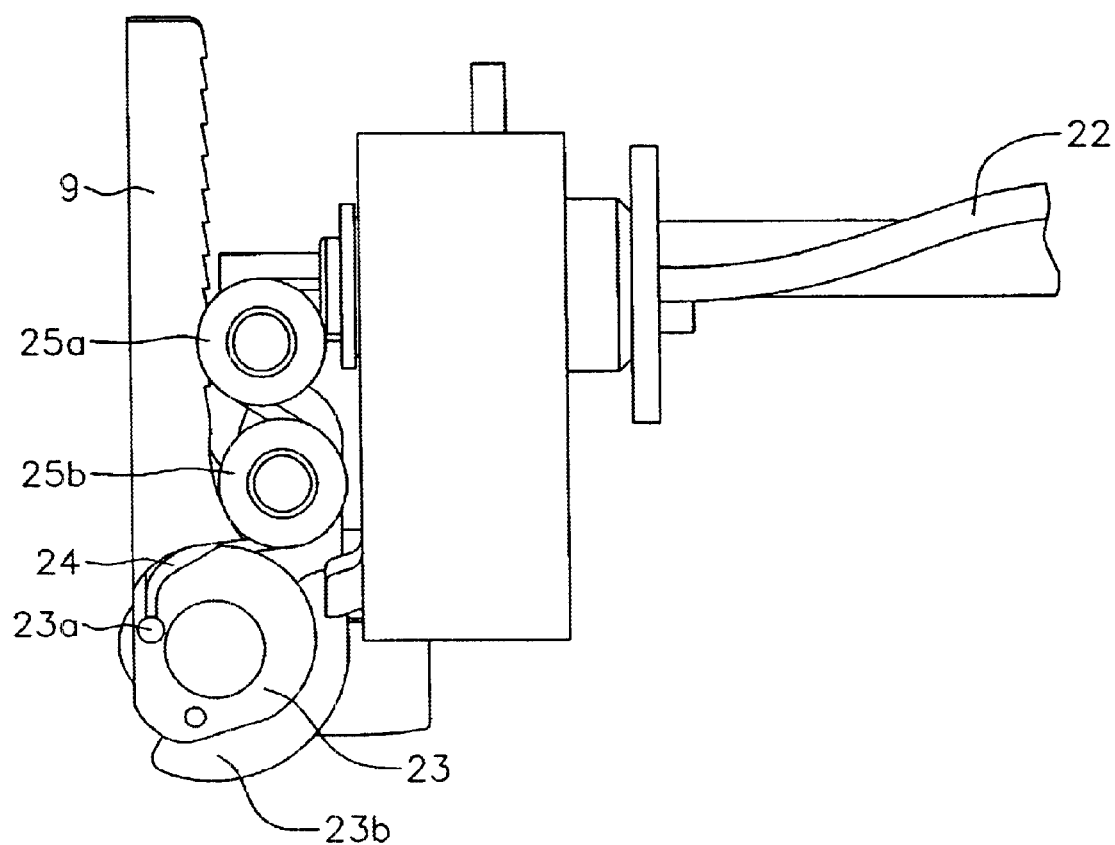
FIGS. 6, 6a and 6b are top plan views of the operating element of the embodiment of FIG. 5 in different positions.
Figure 6A:
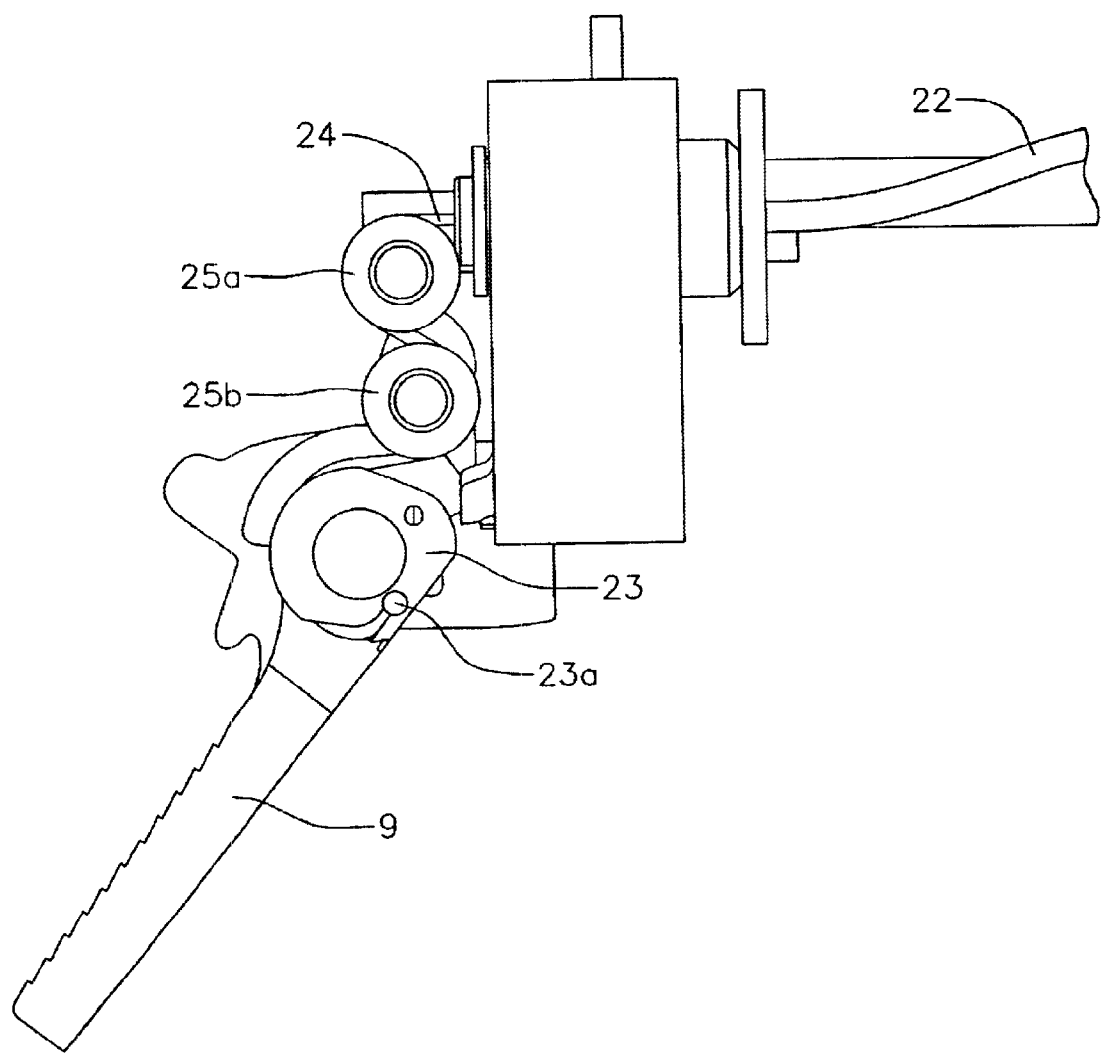
Figure 6B:
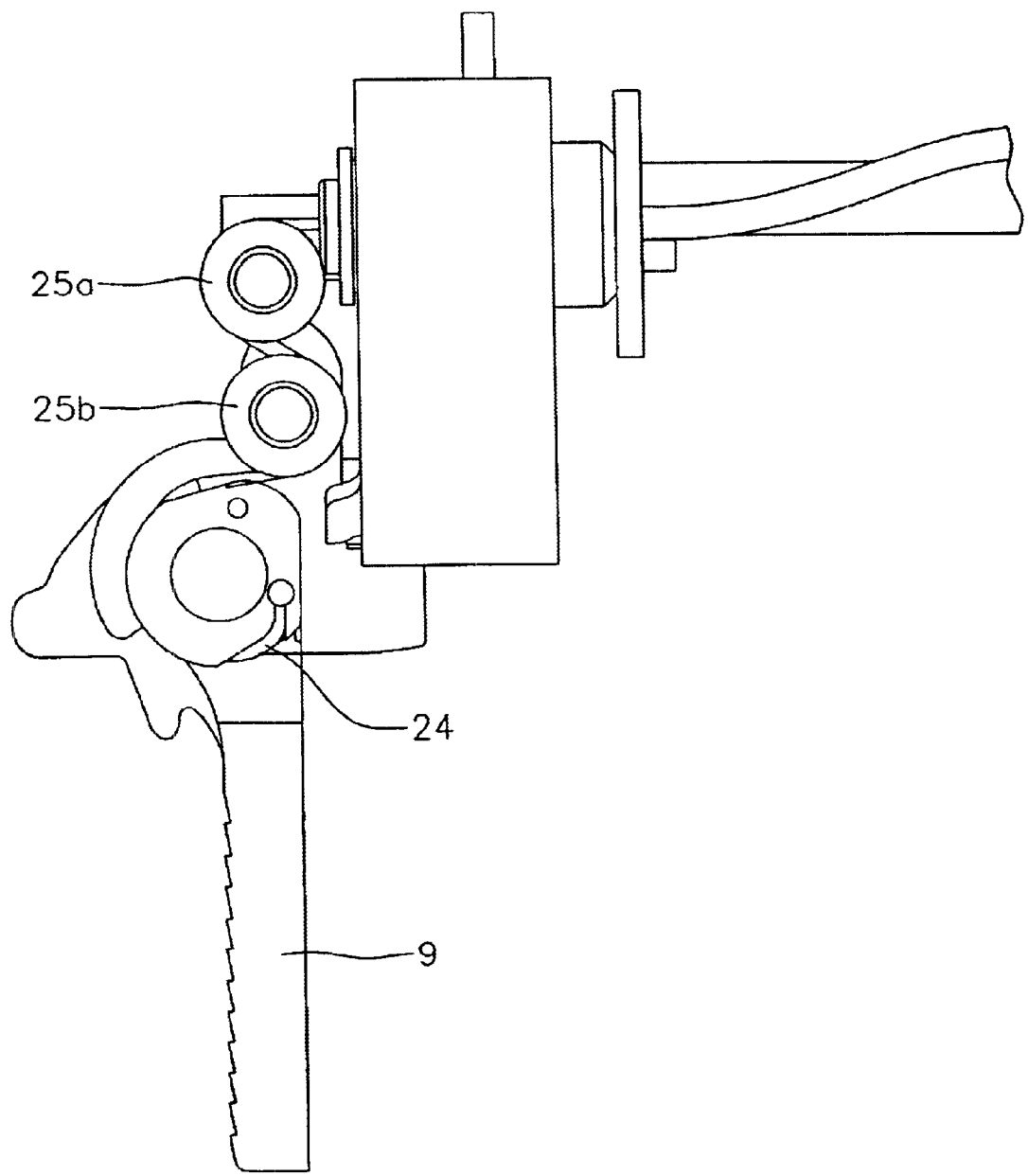

FIG. 6 shows the basic position of the operating lever 9 in which locking and connection of the connector element takes place. After opening up the operating lever 9 to disconnect the connector element 13 in a first movement phase in which the operating lever 9 is moved in the plane of the drawing, the operating lever 9 is swivelled in a plane perpendicular to the plane of the drawing in a following second movement phase to unlock the seat. The second movement phase can thereby be initiated as soon as the operating lever 9 is opened out about 140 (FIG. 6a). FIG. 6b shows the operating lever 9 fully opened out.

Figure 7:
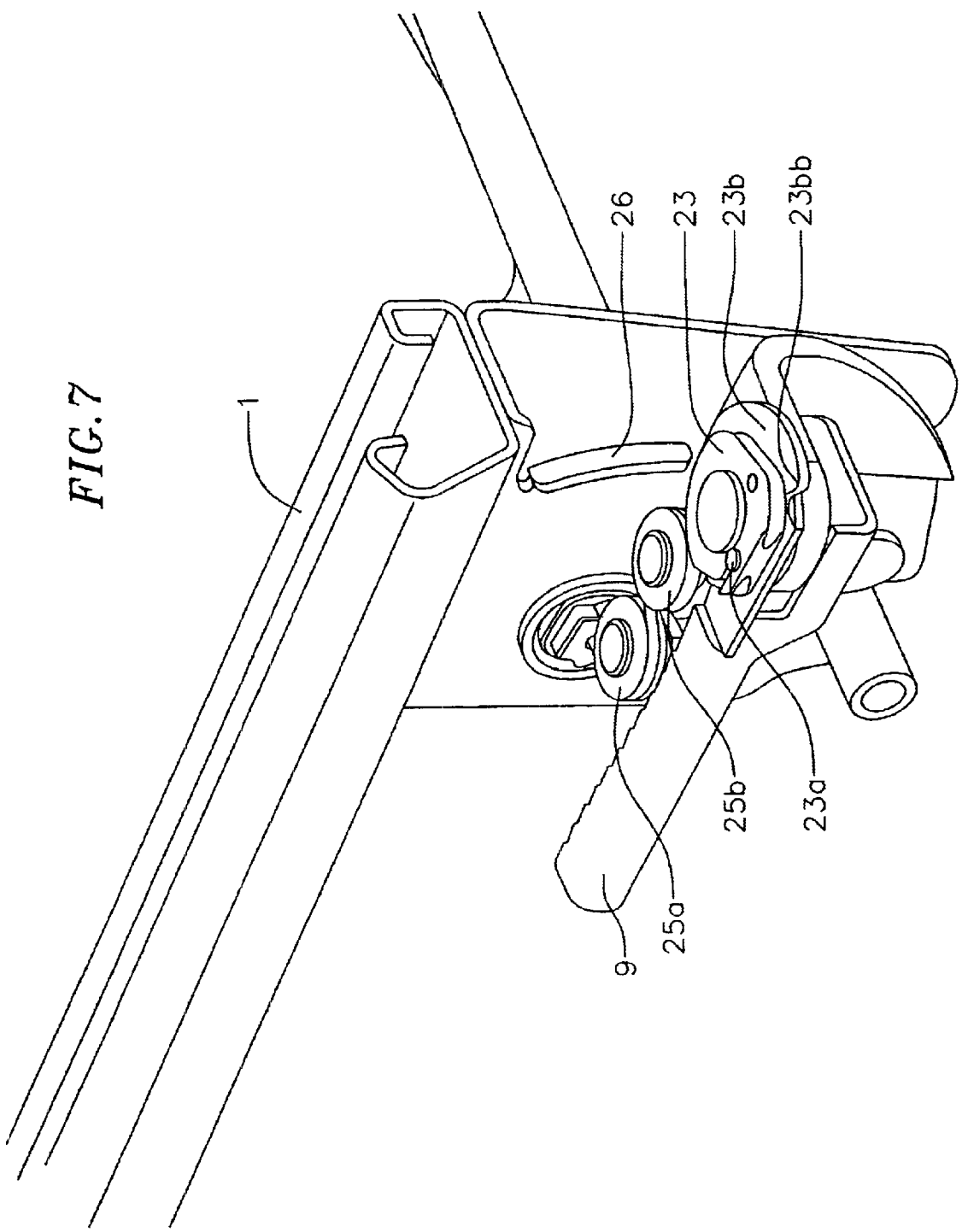
Figure 7B:
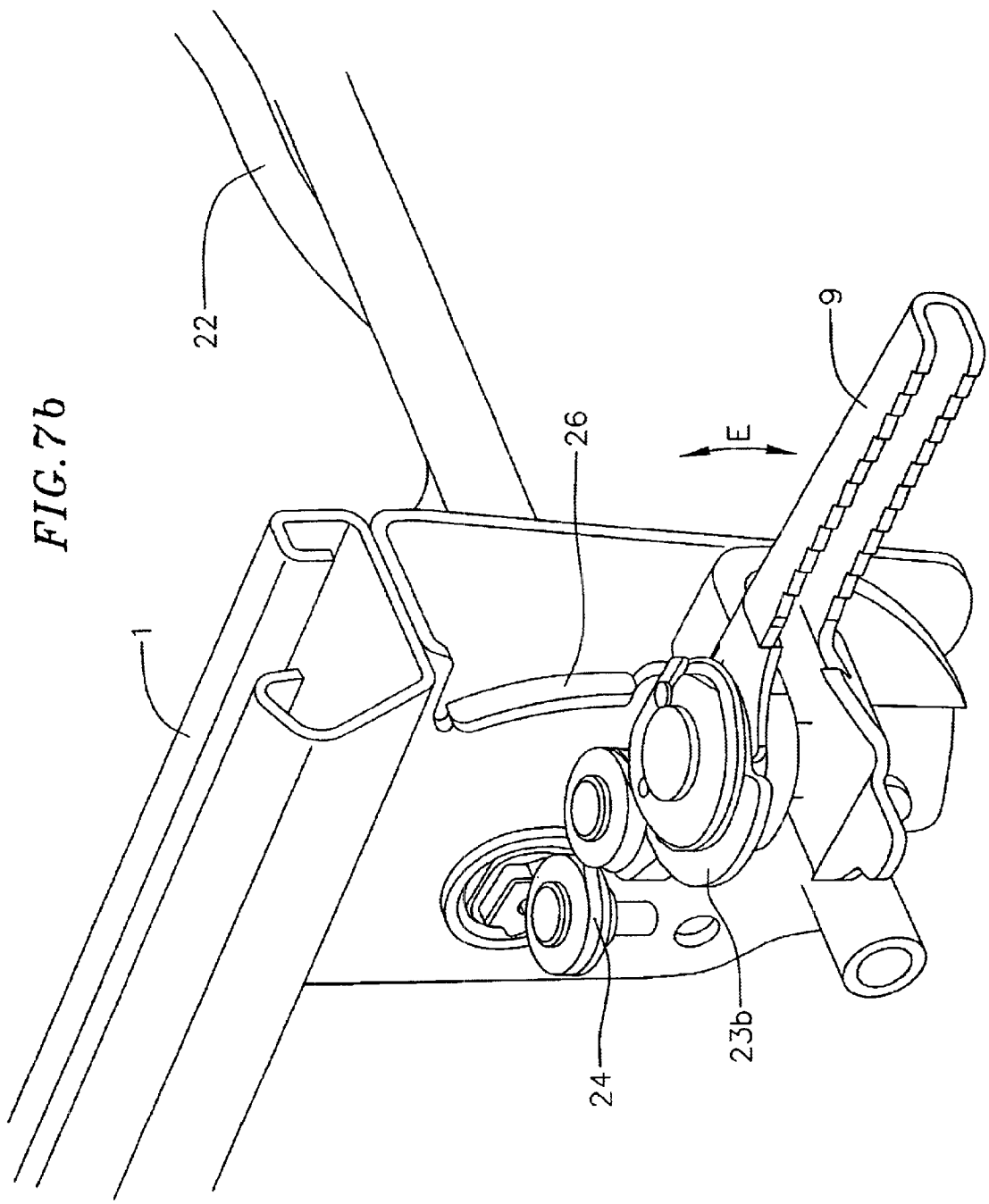

As can be seen from FIGS. 7–7b, during swivel movement of the operating element 9 in the second movement phase, i.e. in the direction of arrow E (see FIG. 7b), the end 23bb of the nose 23b comes to bear behind a guide part 26 so that the operating lever 9 is secured against snapping back and thus any undesired connection of the connector element 13 is reliably prevented.

The nose 23b furthermore means that the operating lever 9 can only be tilted perpendicular to the plane of the drawing (FIG. 6b) or in the direction of the arrow E (FIG. 6) when the first movement phase (disconnection) has completely finished since before this, the nose 23b strikes against the lower edge of the guide part 26 and blocks movement.

After the operating element 9 has swivelled perpendicular to the plane of the drawing (FIG. 6b) or in the direction of arrow E (FIG. 7b) the seat is unlocked and can be removed. The unlocking of the seat thereby takes place as described in respect of FIGS. 1 to 4c. The slight drawback here is that in the removed state the operating lever 9 protrudes inclined upwards, which can lead to damage.

In a further development of the invention (not shown), the cable roller 23 is therefore guided on the operating lever 9 in a slide guide which makes it possible to fold the operating lever 9 back after the unlocking of the seat whereby the nose 23b still bears behind the guide part 26. Swivelling of the operating lever 9 therefore does not result in an activation of the Bowden cable 24. After installation of the seat the cable roller 23 automatically returns back into the starting position through the spring tension associated with locking and connection.

The invention is not restricted in its design to the embodiment described above. It is solely essential for the invention that the contact mechanism and the locking mechanism are coupled together so that a removal or installation of the vehicle seat takes place in at least two chronologically successive phases, whereby the connector element 13 is exclusively connected or disconnected in the first phase and in the second phase the motor vehicle seat is exclusively locked or unlocked.

What is claimed is:

1. A removable motor vehicle seat comprising:
    a locking mechanism for at least one of locking and unlocking the vehicle seat on a vehicle floor;
    an operating element for triggering the locking mechanism;
    at least one electric and/or pneumatic interface with other vehicle components, wherein the interface has a detachable connector element; and
    a contact mechanism provided for at least one of connecting and disconnecting the connector element which is forcibly coupled to the locking mechanism so that at least one of a removal and insertion of the vehicle seat takes place in at least two chronologically successive phases, wherein in one phase the connector element is exclusively at least one of connected and disconnected and in the other phase the vehicle seat is exclusively at least one of locked and unlocked, and wherein, to separate the at least two phases, blocking means are provided which during a connection/disconnection action, a locking/unlocking action is blocked and during the locking/unlocking action, the connection/disconnection action is blocked.

2. The removable vehicle seat of claim 1, wherein the at least two chronologically successive phases of the at least one of removal and installation of the vehicle seat are controlled and triggered through corresponding operating phases of the operating element.

3. The removable vehicle seat of claim 2, wherein the at least two chronologically successive phases are triggered through an at least two-phase swivel movement of the operating element.

4. The removable vehicle seat of claim 3, wherein the swivel movement of the operating element is executed about different swivel axes in both swivel phases.

5. The removable vehicle seat of claim 1, wherein overall there are three chronologically successive phases during the removal of the vehicle seat and, wherein
    a) in a first phase a disconnection of the connector element is carried out;
    b) in a second phase the blocking means is cleared and
    c) in a third phase the vehicle seat is unlocked from the vehicle floor.

6. The removable vehicle seat of claim 1, further comprising two seat rails wherein
    a) the locking mechanism has on each seat rail at least one locking part which can be brought into engagement with a relevant fixing part of the vehicle floor, wherein at least two locking parts of the two seat rails are connected together through a coupling element;
    b) the contact mechanism has means for at least one of attaching and releasing the connector element at the interface, and
    c) the locking part and the means for at least one of attaching and releasing the connector element are both coupled to the operating element.

7. The removable vehicle seat of claim 6, wherein the coupling element can be displaced both in rotation and in translation and is fixedly connected through a follower to the connector element so that
    a) the coupling element in a first movement phase of the operating element is moved in translation wherein through the follower the connector element is at least one of disconnected and connected, and
    b) the coupling element is turned in a second movement phase of the operating element whereby the locking parts are swivelled and the seat is at least one of unlocked and locked.

8. The removable vehicle seat of claim 7, wherein during the disconnection phase rotation of the coupling element and thus unlocking of the seat are prevented through a fixed blocking element against which the follower is supported until disconnection is completed.

9. The removable vehicle seat of claim 6, wherein during at least one of a locking/unlocking action and a connection/disconnection action each other process is blocked in that the degree of freedom of movement of the operating element associated with each other phase is blocked.

10. The removable vehicle seat of claim 6, wherein spring means are provided in the active connection between the operating element and the connector element to produce a pretensioning force on the connector element for its connection in the interface.

11. The removable vehicle seat of claim 6, wherein the active connection between the operating element and the connector element is provided through a draw means connected to the operating element.

12. The removable vehicle seat of claim 10, wherein the active connection between the operating element and the connector element is provided through a draw means connected to the operating element, wherein the draw means operates the spring means, and whereby the spring means are at least one of tensioned and relaxed through the operating element and the connector element is thereby at least one of disconnected and connected.

13. The removable vehicle seat of claim 12, wherein the spring means are connected to the coupling element and exert an axial force on same so that the coupling element during activation of the operating element is moved in translation and consequently the connector element is at least one of connected and disconnected.

14. The removable vehicle seat of claim 13, wherein during removal of the seat the operating element a) is opened out in the first movement phase in a first swivel plane and thereby the spring means become tensioned through the draw means so that the connector element is disconnected, b) is turned in the following second movement phase in a second swivel plane substantially perpendicular to the first swivel plane so that the locking parts are swivelled and the seat is unlocked.

15. The removable vehicle seat of claim 11, wherein the operating element is connected directly to the connector element through a Bowden cable.

16. The removable vehicle seat of claim 11, wherein the draw means is fixed on the operating lever on a cable roller.

17. The removable vehicle seat of claim 16, wherein the draw means before fixing on the cable roller is guided over two guide pulleys.

18. The removable vehicle seat of claim 16, wherein the cable roller has a protruding nose which in the second movement phase of the operating element comes to bear behind a fixed stop and thereby ensures that the operating element does not snap back as a result of the spring tension.

19. The removable vehicle seat of claim 1, wherein the releasable connector element is associated with a socket fixed on the bodywork.

20. The removable vehicle seat of claim 1 further comprising two seat rails, wherein the connector element and the operating element are fixed on the seat rails.

21. The removable vehicle seat of claim 1, wherein the connector element and the operating element are fixed on different seat rails of the seat.

* * * * *

UNITED STATES PATENT AND TRADEMARK OFFICE
CERTIFICATE OF CORRECTION

PATENT NO. : 6,663,157 B1
DATED : December 16, 2003
INVENTOR(S) : Jochen Hofmann et al.

Page 1 of 1

It is certified that error appears in the above-identified patent and that said Letters Patent is hereby corrected as shown below:

Title page,
Item [75], Inventors, replace "Kups" with -- Marletgrintz --
Item [56], References Cited, FOREIGN PATENT DOCUMENTS, add
-- EP 0 909 676 A2; 04-21-1999; Karl-Heinz Fritz, et al. --
OTHER DOCUMENTS, add -- Examination report issued July 25, 2003, listing European Patent EP 0 909 676 --

Signed and Sealed this

Fifteenth Day of February, 2005

JON W. DUDAS
*Director of the United States Patent and Trademark Office*